(12) United States Patent
Gordon et al.

(10) Patent No.: US 9,481,853 B2
(45) Date of Patent: *Nov. 1, 2016

(54) METHOD FOR CAVITATION-ASSISTED REFINING, DEGUMMING AND DEWAXING OF OIL AND FAT

(71) Applicant: Cavitation Technologies, Inc., Chatsworth, CA (US)

(72) Inventors: Roman Gordon, Studio City, CA (US); Igor Gorodnitsky, Marina del Rey, CA (US); Varvara Grichko, Woodland Hills, CA (US)

(73) Assignee: Cavitation Technologies, Inc., Chatsworth, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 14/531,827

(22) Filed: Nov. 3, 2014

(65) Prior Publication Data
US 2015/0057460 A1 Feb. 26, 2015

Related U.S. Application Data

(63) Continuation of application No. 12/484,981, filed on Jun. 15, 2009, now Pat. No. 8,911,808, which is a continuation-in-part of application No. 12/144,539, filed on Jun. 23, 2008, now abandoned, and a continuation-in-part of application No. 12/395,110, filed on Feb. 27, 2009, now Pat. No. 7,762,715, and a continuation-in-part of application No. 12/464,646, filed on May 12, 2009, now Pat. No. 8,042,989.

(51) Int. Cl.
| | |
|---|---|
| *C11B 3/16* | (2006.01) |
| *B01F 5/06* | (2006.01) |
| *B01F 13/10* | (2006.01) |
| *B01J 10/00* | (2006.01) |
| *B01J 19/00* | (2006.01) |
| *B01J 19/02* | (2006.01) |
| *B01J 19/24* | (2006.01) |
| *C10G 17/00* | (2006.01) |
| *C10G 21/00* | (2006.01) |
| *C10G 29/00* | (2006.01) |
| *C10G 31/08* | (2006.01) |
| *C11B 3/00* | (2006.01) |
| *C11B 3/04* | (2006.01) |
| *C11C 3/00* | (2006.01) |

(52) U.S. Cl.
CPC ............ *C11B 3/16* (2013.01); *B01F 5/0644* (2013.01); *B01F 5/0646* (2013.01); *B01F 5/0652* (2013.01); *B01F 5/0653* (2013.01); *B01F 5/0682* (2013.01); *B01F 5/0688* (2013.01); *B01F 13/1025* (2013.01); *B01F 13/1027* (2013.01); *B01J 10/002* (2013.01); *B01J 19/008* (2013.01); *B01J 19/0066* (2013.01); *B01J 19/02* (2013.01); *B01J 19/2415* (2013.01); *C10G 17/00* (2013.01); *C10G 21/00* (2013.01); *C10G 29/00* (2013.01); *C10G 31/08* (2013.01); *C11B 3/001* (2013.01); *C11B 3/006* (2013.01); *C11B 3/04* (2013.01); *C11C 3/003* (2013.01); *B01J 2219/0218* (2013.01); *B01J 2219/0231* (2013.01); *B01J 2219/0245* (2013.01)

(58) Field of Classification Search
CPC ...................................................... C11B 3/001
See application file for complete search history.

(56) References Cited

U.S. PATENT DOCUMENTS

| | | | |
|---|---|---|---|
| 4,280,962 A | 7/1981 | Watanabe et al. | |
| 4,698,185 A * | 10/1987 | Dijkstra | C11B 3/06 |
| | | | 554/176 |
| 5,696,278 A | 12/1997 | Segers | |
| 5,810,052 A | 9/1998 | Kozyuk | |
| 5,931,771 A | 8/1999 | Kozyuk | |
| 5,969,207 A | 10/1999 | Kozyuk | |
| 5,971,601 A | 10/1999 | Kozyuk | |
| 6,001,640 A | 12/1999 | Loeffler et al. | |
| 6,190,538 B1 | 2/2001 | Gosselink et al. | |
| 6,502,979 B1 | 1/2003 | Kozyuk | |
| 6,705,396 B1 | 3/2004 | Ivannikov et al. | |
| 6,955,753 B1 | 10/2005 | Gomez | |
| 7,135,155 B1 | 11/2006 | Long, Jr. et al. | |
| 7,207,712 B2 | 4/2007 | Kozyuk | |
| 7,338,551 B2 | 3/2008 | Kozyuk | |
| 8,911,808 B2 * | 12/2014 | Gordon | B01F 5/0644 |
| | | | 426/238 |

FOREIGN PATENT DOCUMENTS

| | | |
|---|---|---|
| RU | 2288948 C1 | 12/2006 |
| RU | 2333942 C1 | 9/2008 |

OTHER PUBLICATIONS

Branson Ultrasonic S.A.; Ultrasonic Liquid Processing; Technical specification on Branson's ultrasonic liquid processing cell; Switzerland, Jul. 1978.
Branson Ultrasonic Corporation; Ultrasonic Liquid Processing; Technical specification on Branson's ultrasonic liquid processing cell; USA; Sep. 1986.
Branson Ultrasonic Corporation; Technical drawing sheet, 1" Dia. Hi Pressure Proc. Cell Assy, Dwg. No. 101-123-007; Dec. 1978.
Branson Ultrasonic Corporation; Technical drawing sheet, Orifice Plug—1" Dia Horn, Dwg. No. 100-080-064; Jul. 28, 1978.
Moulton KJ, Wang Lc; A Pilot-Plant Study of Continuous Ultrasonic Extraction of Soybean Protein (1982); J. Food Sci. 47: 1127-1129.

(Continued)

*Primary Examiner* — Randy Boyer
(74) *Attorney, Agent, or Firm* — Kelly & Kelley, LLP

(57) ABSTRACT

A method for degumming and/or refining crude oil containing impurities involving mixing the crude oil with degumming agents, i.e., water or acid, and subjecting the mixture to flow-through, hydrodynamic cavitation processing. The cavitational processing transfers impurities in the crude oil to a water phase for easier separation. The water phase may be separated from the oil phase by commonly available separation methods.

24 Claims, 4 Drawing Sheets

(56) References Cited

OTHER PUBLICATIONS

Moulton KJ, Koritala S, Warner K, Frankel En; Continuous Ultrasonic Hydrogenation of Soybean Oil. II. Operating Conditions and Oil Quality (1987); J. Am. Oil Chem. Soc. 64: 542-547.
Moulton KJ; Processing with ultrasonic energy (1989); J. Am. Oil Chem. Soc. 66: 896-904.
Moulton KJ, Koritala S, Frankel EN; Ultrasonic hydrogenation of soybean oil; (1983) J. Am. Oil Chem. Soc. 60: 1257-1258.
Sinram RD; Nephelometric determination of Phosphorus in Soybean and Corn-oil Processing (1986); J. Am. Oil Chem. Soc. 63: 667-670.
Snyder J, Mounts T, Holloway R; An Analysis Scheme for Estimation of Crude Oil Quality (1991); J. Am. Oil Chem. Soc. 68: 285-288.
Liu H, Przybylski R, Eskin Nam; Turbidimetric Measurement of Haze in Canola Oil by Acetone Precipitation (1996); J. Am. Oil Chem. Soc. 73: 1557-1560.
Moulton, K.J., Mounts, T.L.; Continuous Ultrasonic Degumming of Crude Soybean Oil; JAOCS vol. 67, No. 1 (Jan. 1990); pp. 33-38.
Moholkar, V.S. et al.; Hydrodynamic cavitation for sonochemical effects; Elsevier Science B.V.; Ultrasonics Sonochemistry 6 (1999); pp. 53-65.
Shah, Y.T. et al., Cavitation Reaction Engineering, The Plenum Chemical Engineering Series, 1999, Kluwer Academic/Plenum Publishers, New York.
IKA Mixing, Catalog 2005/06 for Ultra-Turrax Devices.

* cited by examiner

METHOD FOR CAVITATION-ASSISTED REFINING, DEGUMMING AND DEWAXING OF OIL AND FAT

RELATED APPLICATION

This application is a continuation of U.S. application Ser. No. 12/484,981, filed Jun. 15, 2009, which application is a continuation-in-part of U.S. application Ser. No. 12/144,539 filed Jun. 23, 2008, Ser. No. 12/395,110 filed Feb. 27, 2009 and Ser. No. 12/464,646 filed May 12, 2009.

BACKGROUND OF THE INVENTION

The invention relates generally to both methods of refining crude vegetable oils and crude animal fats, as well as, cavitation apparatuses that are used for processing fluidic mixtures. The invention uses energy released upon implosion and/or pulsation of cavitation features to alter properties of the fluids. More particularly, the present invention relates to the degumming of oils by utilizing cavitational processing to modify hydratable and/or non-hydratable phosphatides (NHP) and metals followed by separation to obtain a refined and more valuable product. The method finds applications in food, chemical, pharmaceutical and other industries.

The preferred oils that can be refined and/or degummed using the present invention are edible vegetable oils, i.e., canola, coconut, corn, cottonseed, grape seed, ground nut, linseed, palm, peanut, rapeseed, rice bran, safflower, soybean, sunflower and other edible vegetable oils that are valuable food sources. Crude vegetable oils can be produced from vegetable seeds by solvent extraction followed by filtration of the obtained miscella to remove solids and particulate.

Crude vegetable oils are comprised mainly of triglycerides and contain impurities, such as phosphatides, free fatty acids (FFA), off-flavor compounds, chlorophyll and other pigments, waxes, and metals, such as aluminum, calcium, copper, iron, magnesium and potassium. The impurities negatively affect taste, smell, appearance and shelf life of oils and, thus, have to be removed before consumption.

The crude oils are produced by pressing flaked (comminuted), dried seeds or beans. The cold-pressed oil is obtained from seeds without prior heating. The oilseeds may be hot-pressed following conditioning at ~80° C. for about a half an hour. Hot pressing provides better yields but can lead to increased oil deterioration and accumulation of non-hydratable phosphatides, i.e. calcium, iron and magnesium salts of phosphatic acid and phosphatidylethanolamine (PE) due to the action of lipases and other enzymes that are highly active at 57-85° C.

Phosphatides are derivatives of glycerol phosphate, which normally contain a nitrogenous base. Phosphatic acid has a glycerol backbone with a saturated fatty acid bonded to carbon 1, an unsaturated one attached to carbon 2, and a phosphate group bonded to carbon 3. Elevated levels of PA are found in unripe, damaged, sick and over moist seeds. To assure a higher quality of oil, commercial producers minimize the exposure of seeds to temperatures in the 57-80° C. range during storage, treatment and transportation. In order to deactivate phosphalipases, seeds are treated with steam heated to 150-170° C. After such treatment, the concentrations of iron, calcium and magnesium salts of phosphatic acid reduce to ~25-50% of the amount obtained through conventional processing (Cmolik and Pokorny, 2000; Gunstone et al., 2007).

When producing biodiesel from such crude oils, it is highly desirable to reduce the phosphorus content to at most 20 ppm in oil, grease, fat or tallow feedstock to ensure that the final product meets EPA regulatory standards on diesel engine exhaust emission. Oil refining procedures depend on the type of oil and its composition and usually consist of degumming, alkali neutralization, bleaching and deodorization. Degumming refers to the removal of phosphatides and other similar compounds by adding water and/or acid to oil and centrifuging. The main purpose of the degumming is to remove phosphorus, which is present in the crude oil in the form of hydratable phosphatides and NHP. Without efficient removal of the phosphatides, the downstream refining procedures may not deliver acceptable results. In addition to the removal of NHP, the removal of iron and other metals is highly desirable (Racicot and Handel, 1982; Cvengros, 1995; Cmolik and Pokorny, 2000). The oil then can be bleached, dewax, hydrogenated and/or deodorized to produce a more stable product.

A number of prior art degumming methods have been developed, including water degumming (treatment of crude oil with hot water); acid degumming (treatment of crude oil with phosphoric acid or citric acid); acid refining (treatment of water-degummed oil with an acid, which is then partially neutralized with alkali and centrifuged to remove residual gums and free fatty acids); dry degumming (acid degumming with very small amount of water, combined with bleaching); enzymatic degumming (modification of phospholipids with enzymes to obtain the water-soluble compounds); degumming with help of chelating agents (EDTA-ethylenediaminetetraacetic acid, aspartic amino acid, organic malic and fumaric acids, etc.); and membrane/ultra filtration degumming (passage of crude oil through a semi permeable membrane impermeable to phospholipids).

Physical refining, also known as dry or steam refining, is based on the higher volatility of FFA compared to triglycerides. In this method, removal of FFA via neutralization is substituted by simultaneous deacidification-deodorization. The techniques of degumming, alkaline refining, bleaching, hydrogenating, dewaxing and deodorizing are well known in the art. It should be understood that each refining procedure results in some loss of oil.

Phospholipids are the major constituents of biological membranes, which are present in all living species. They are quantified by determining the phosphorus (P) content, i.e., the total concentration of phospholipids in oil is indicated as parts per million of phosphorus (ppm P). The concentration of phospholipids is calculated by multiplying the measured value for ppm P by a factor 30. For example, the phosphorus content of crude soybean oil is 400-1200 ppm and that of the degummed oil is usually 10-100 ppm. The phosphatide content of the oil should be close to 20 ppm P before bleaching and 5 ppm P before stripping.

If the key objective of degumming is the removal of hydratable phospholipids, the preferred procedure is water degumming. In this method, warm crude oil is usually treated with superheated steam (220° C. or higher) under low pressure. Hydratable phosphatides become insoluble in oil due to the absorption of water and, therefore, can be efficiently isolated. A gum layer that forms after a period of time is separated via centrifuging and is used for production of lecithin.

Lecithin is recognized by the FDA as GRAS, i.e. Generally Regarded as Safe, 21 CFR, 1841400, and is used as a non-toxic surfactant, emulsifier, lubricant and to produce liposomes. Commercial lecithin is a mixture of various phospholipids, such as phosphatic acid, phosphatidylethanolamine, phosphatidylcholine, and phosphatidylinositol, depending on the source and production. In hydrolyzed lecithin, one fatty acid is removed by a phospholipase.

Water degumming is utilized commonly with palm and coconut oils and is not associated with significant oil loss, saponification, or environmental pollution. However, the water-degummed oils may contain 100-250 ppm P in the form of NHP, resulting in poor quality and low oxidative stability (Racicot and Handel, 1982; Athenstaedt and Daum, 1999). In this case, water-degumming is typically followed by or substituted with acid degumming or another procedure.

Degumming of crude triglyceride oils that were not affected by a prior enzymatic activity is disclosed in U.S. Pat. No. 5,696,278 to Segers. The process in Segers involves repeated and prolonged heating of the oil.

Soybean, sunflower and many other oils are usually acid degummed due to a high level of calcium and magnesium salts of phosphatic acid, which cannot be removed by water degumming. In acid degumming, phosphoric acid, citric acid, oxalic acid, tartaric acid or maleic anhydride are dispersed in oil followed by raising the pH with a base, and separating the NHP, FFA, liposaccharides, lipoproteins and some trapped triglycerides. The acid degumming requires downstream washing and can be associated with a substantial oil loss. The acid-degummed oil then is decolorized by heating in the presence of bleaching earth, charcoal or attapulgite clay at a reduced pressure (Lin and Yoo, 2007). In a final deodorization step, volatile compounds are removed from the bleached oil by steam stripping under vacuum. In practice, the numerous combinations of these and other procedures are applied, depending on certain properties of the oils. For example, the concentration of phospholipids in the oil can be lowered to 5 ppm P by using EDTA and emulsifying additives following the extraction of phospholipids with hot water (Choukri et al., 2001).

U.S. Pat. No. 4,698,185 to Dijkstra et al. discloses a process for the simultaneous production of degummed vegetable oils and gums with a high PA concentration. The starting materials for this process are water-degummed vegetable oils, which contain excessive NHP and iron. In a first stage, phosphoric acid is dispersed in the water-degummed oil and sufficient time is allowed for the salts of phosphatic acid to decompose. In a second stage, a base is added to increase the pH value above 2.5 without causing substantial saponification. In a third stage, the aqueous phase containing the gums and the oil phase are separated. While this process results in degummed oil with very low phosphorus and iron concentrations and gums of high PA content with improved usability, it requires multiple processing steps and a prolonged residence time.

Triglyceride oils can be degummed by using alkali. The method comprises the conversion of FFA in soaps and the separation of phospholipids that concentrate in the water phase. However, the alkali degumming requires oil washing and extra centrifugations and produces waste in the form of soap. Acid degumming is a preferred process.

Another degumming procedure allows for the removal of NHP from oils by using potassium and sodium chloride. The water-degummed soybean, rice bran and mustard oils treated with the solution of 1.5% potassium chloride and 0.5% sodium chloride (95:5 v/v), contains as low as 0.05, 0.06 and 0.02% phospholipids, correspondingly. This method, when combined with water degumming, removes NHP with ~4% oil loss (Nasirullah, 2005).

Phospholipases, the enzymes that modify phospholipids, have found numerous applications in oil degumming, which has resulted in substantial environmental benefits. The efficiency of enzymatic degumming is improved via genetic engineering (De Maria et al., 2007).

Among the methods of physical degumming, the application of selective membranes is a promising method that offers several advantages over conventional technologies. Ultrafiltration efficiently separates phospholipids and can be utilized in both degumming and dewaxing of undiluted oils and oils diluted with hexane to improve flux. Nonporous membranes are a better choice for simultaneous degumming, dewaxing and decolorization. Further improvement of membrane technology is desirable for industrial application (Manjula and Subramanian, 2006).

It is well known that an increase in both pressure and temperature along with vigorous mixing provided by cavitation can initiate and accelerate numerous reactions and processes. Enhancing the reaction yields and process efficiencies by means of the energy released upon the collapse of cavities generated in the fluidic media has found numerous applications. Although extreme pressure or heat can be disadvantageous, the outcome of an optimized cavitation treatment has proven to be beneficial.

Cavitation can be of different origins, including hydrodynamic, acoustic, ultrasonic, laser-induced and generated by injecting steam into a cooled fluid. Simultaneous application of two or more cavitation-generating techniques may provide an even better outcome, i.e., coupling steam injection cavitation with acoustic cavitation improves efficiency by 16 times (Young, 1999; Gogate, 2008; Mahulkar et al., 2008).

It has been reported that crude soybean oil can be quickly degummed by applying ultrasound sonication in the presence of a small amount of degumming agent (Moulton and Mounts, 1999). The procedure removes up to 90-99% phospholipids. However, it should be noted that the sound technology requires using a batch environment. Since the effect diminishes with the increase in a distance from the radiation source, the treatment efficacy of sonic cavitation depends on a container's size and is low with larger vessels. The alterations occur at particular locations, depending on the radiation frequency and, thus, are not uniform. Moreover, sound-assisted cavitation cannot be used efficiently in continuous processes with a high throughput. In sonic cavitation, the energy requirement is too high and the residence time is too long to be economically feasible for high throughput degumming. The power requirements for ultrasonic devices integrated in-line may reach 1 MW for 20-100 $m^3/h$ flow velocities.

Distinct from acoustic cavitation, flow-through hydrodynamic cavitation does not require using a vessel. Numerous flow-through hydrodynamic apparatuses are known. See, for example, U.S. Pat. No. 6,705,396 to Ivannikov et al. and U.S. Pat. Nos. 7,338,551, 7,207,712, 6,502,979, 5,971,601 and 5,969,207 to Kozyuk that disclose hydrodynamic cavitation apparatuses and their applications.

Now, with the cost of energy and human health concerns rising rapidly, it is highly desirable to lower level of impurities in edible oils and biodiesel and reduce the energy consumption of refining. The prior art techniques do not offer the most efficient method of degumming and refining of oils, especially edible vegetable oils in the shortest amount of time possible.

Therefore, a need exists for an improved method for processing oils and fats. The inventive method and devices are desired particularly at oil refineries during harvest, when throughput is a key factor. The present invention provides such methods and devices, while producing improved product with shorter processing time and less accumulation of waste harmful to environment.

The present invention provides a method and device for generating cavitation in a flow of oil to be treated within at least one cavitation chamber, preferably in multiple consecutive cavitation chambers. This goal is achieved through the design of a cavitation device aimed at fast degumming/refining of vegetable oils and animal fats.

To achieve as large a profit margin as possible it is necessary to decrease time, energy consumption and eliminate waste production of degumming. The prior art methods do not offer the most efficient method in the shortest time possible. Therefore, a need exists for the improved method and device for oil degumming with a minimal residence time and energy cost that produces degummed oils with low levels of phosphorus and metals. The present invention satisfies these needs and provides other related advantages.

SUMMARY OF THE INVENTION

The present invention is directed to a method for processing fluidic oils in single- or multi-stage flow-through hydrodynamic cavitation devices. The present invention is directed to a method for degumming and/or refining crude oil containing impurities. The types of crude oil to be degummed and/or refined include edible vegetable oil, animal fat or tallow, or oil from bacteria, yeast, algae, prokaryotes or eukaryotes. The impurities include phosphatides, free fatty acids, off-flavor compounds, sulphurous compounds, pigments, chlorophyll, waxes, metals, carbohydrates, liposaccharides, proteins, aldehydes, ketones, terpenes, sterols or carotenes.

The method begins with providing a flow-through, hydrodynamic cavitation device having a flow path there through. The flow-through, hydrodynamic cavitation device is configured as described in the co-pending applications identified and discussed below. Next, the crude oil is mixed with a degumming agent to form a mixed fluid having an oil phase and a water phase. Preferably, the degumming agent comprises water, steam, phosphoric acid, citric acid, oxalic acid, tartaric acid, malic acid, fumaric acid, aspartic amino acid, ethylenediaminetetraacetic acid, alkali, salts, chelating agents, crown ethers, soluble or immobilized lipases, enzymes, or maleic anhydride. The crude oil may also be mixed with a solvent such as hexane to improve flux.

The mixed fluid is them pumped into the flow path of the cavitation device at a pre-determined pump pressure. The pump pressure is preferably in the range of 50-5,000 psi. The mixed fluid may be heated prior to performing the pumping step, but it is not necessary. In fact, a preferred embodiment has the mixed fluid at ambient temperature just prior to pumping. Next, cavitational features are generated in the mixed fluid by virtue of being passed through the cavitation device. The cavitation features assist and accelerate the process of transferring the impurities from the oil phase to the water phase. Finally, the oil phase is separated from the water phase. The separation is preferably performed using sedimentation, centrifugation, filtration, distillation, extraction or washing.

The mixed fluid may be agitated prior to performing the pumping and generating steps. In addition, the crude oil may be processed in the cavitation device prior to performing the mixing step. The pumping and generating steps may be repeated prior to performing the separating step. Alternatively, the mixing, pumping, generating and separating steps may be repeated using the separated oil phase.

It has been found that hydrodynamic cavitation significantly facilitates degumming of oil, allowing fast and efficient removal of phospholipids, metals and other impurities. The present invention leads to the creation of cavitational micro-bubbles in a fluidic mixture of oil, fat (tallow) and/or water resulting in the production of degummed oil without phosphatides, metals and other impurities. Improved degumming is achieved through the design of a cavitation device which expedites the degumming process and is followed by separating the gums from the oil.

In a preferred embodiment, the fluidic crude oil may be mixed with mineral-free water or a solution containing degumming reagent(s). The mixture is pumped into the device at a predetermined pump pressure through a front multi-jet nozzle having a plurality of channels. Pumping the mixture through the nozzle causes the pressure of the fluid to fluctuate, which creates numerous cavitational features, i.e., bubbles, in the oil-water mixture. The degumming is facilitated by creating unsteady flows with the help of Venturi nozzles that are described elsewhere (Fedotkin and Gulyi, 2000; Mahesh et al., 2004; Li et al., 2008). Cavitation intensity can be controlled by varying the inlet pump pressure. The cavitation process is maintained for a period of time sufficient to obtain the refined product.

The cavitation temporarily separates the high-boiling oil constituents from the entrapped gases, water vapor and the vapors of the volatile impurities that can be found within the bubbles. The pulsation and/or implosion of these bubbles mixes the oil and water, greatly increasing the surface contact area of these unmixable liquids. The fluidic mixture loses all cavitational features in an atomizing cone disposed at the end of the apparatus.

In most cases, the degumming of oils with the flow-through hydrodynamic cavitation can be carried out efficiently with distilled, de-ionized, soft water or similar type of water with no chemical agents added. During the softening process the calcium and magnesium ions in the water attach to resin beads, replacing the sodium, which is released into the water. The use of such water significantly improves the environmental impact, since no hazardous waste accumulates.

The produced gums are of a high quality and can be used for production of lecithin and other valuable by-products with improved yields over existing processes. Depending on the initial temperature of the water and oil, the level of impurities in the oil, the water-to-oil ratio, the inlet pressure of the cavitation apparatus and other initial conditions, the produced gums may be a bottom layer or a top layer. While this is less important where separation is achieved with centrifuging, the location of the gum layer in relation to the oil layer may be beneficial when using other separation techniques.

If needed, steam, phosphoric acid, citric acid, alkali, salts, chelating agents, crown ethers, soluble or immobilized lipases and other enzymes (Balcao et al., 1996; Mahmood et al., 2008), and other degumming agents can be used along with the cavitation process to improve the degumming. Since hydrodynamic cavitation-assisted degumming provides vigorous mixing, it usually requires substantially smaller amounts of degumming agents than conventional methods. In addition, hydrodynamic cavitation-assisted degumming can be scaled up easily to accommodate large throughputs.

Often, cavitation-assisted degumming does not require preheating of crude vegetable oil or water and, therefore, can be conducted at ambient temperatures or temperatures below the ambient, preferably at 15-25° C. This protects unsaturated fatty acids from oxidation and deterioration and conserves energy.

The term oil includes, but is not limited to homogeneous or heterogeneous oil of plant origin and animal fat or tallow existing in a liquid phase immediately prior to cavitation. The oil may also be produced by wild type or genetically modified bacteria, yeast, algae and other prokaryotes and eukaryotes, a two-phase or multi-phase system comprised of oil, water and/or other immiscible liquids, solutions of salts, acids, alkali, gases and/or other solutes, dispersions, emulsions, suspensions, melted solids, gases in a supercritical state and mixtures thereof. The fluid may be heated, cooled, degassed or saturated with nitrogen, carbon dioxide, and other gasses or mixtures thereof.

Accordingly, besides the objects and advantages of the expeditious oil degumming described above, several objects and advantages of the present inventions are:

(1) to ease operation, improve productivity, reduce energy consumption and waste generation of oil degumming/refining;
(2) to provide a continuous flow apparatus for degumming oil in a dramatically expedited and simplified manner with optimized costs;
(3) to provide a method of degumming by subjecting oil and water or solution of degumming agent or mixture thereof to at least one hydrodynamic cavitation event;
(4) to provide a method for the gradual, cascade-type refining of oils by subjecting the original constituents of said oils and water or a degumming solution to a first cavitation event followed by subjecting the residual original compounds and products of the reactions to subsequent cavitation events;
(5) to provide a device for degumming/refining at the site of crude oil production;
(6) to provide a method for degumming without employing the high temperature and pressure associated with conventional methods;
(7) to provide a method for cavitation-assisted degumming of oil in an atmosphere deprived of oxygen to prevent oxidation of unsaturated fatty acids and other dietary constituents that may be beneficial;
(8) to provide a degumming method by subjecting oil to at least one hydrodynamic cavitation process accompanied by steam injection, optimizing the cavitation threshold;
(9) to provide a method, wherein two or more flow-through hydrodynamic cavitation systems are employed.

The objects of the present invention are achieved by feeding oil and water in the flow-through hydrodynamic cavitation apparatus to carry out the transfer of phospholipids and other impurities from oil into water. The phenomenon is called cavitation because cavities form when the flow pressure has been reduced to the fluid's vapor pressure. The vapor bubbles expand and suddenly collapse upon reaching a region of higher pressure. The violent collapse causes increases in localized pressure and temperature and intense shearing forces, resulting in thorough mixing and reactions.

It is an equipment cost decision the type of flow-through hydrodynamic cavitation apparatus to employ since a number of configurations are technically feasible, whether for large scale continuous degumming or refining of small quantities. One can ensure optimal conditions by creating intense cavitation evenly throughout the oil-water flow while avoiding wasting energy. Ideally, the energy applied should be lowered to an optimized level where cavitation still effectively occurs and energy expenditure is minimal.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

With reference to the attached drawing figures, a method for degumming oils through the creation of cavitation events is disclosed. Certain production oils contain contaminants such as phosphatides, free fatty acids, metal impurities, sulphurous compounds, carbohydrates, liposaccharides, proteins, aldehydes, ketones, terpenes, sterols, chlorophyll, carotene and other impurities. These contaminants need to be removed prior to subsequent processing of the oil, fat or tallow. In addition, the contaminants are useable in other processes depending upon their purity. Although the following discussion primarily refers to oil, it is also intended to include fat and tallow The objects of the present invention are achieved by feeding fluidic oil in a flow-through hydrodynamic cavitation device to hydrate phosphatides and induce chemical reactions that favor degumming and refining. Hydrodynamic cavitation results in the formation of vapor cavities in the oil-water flow when accelerated with a pump. The phenomenon is called cavitation because when the flow pressure reduces to the water vapor pressure cavities form. The cavities collapse upon reaching a downstream high-pressure region. The collapse produces an increase in pressure and temperature, as well as intense shearing forces, resulting in mass transfer between the oil and water phases and increased chemical reactions. Ideally, cavitation occurs evenly and efficiently with minimal energy expenditure.

Figure 1:
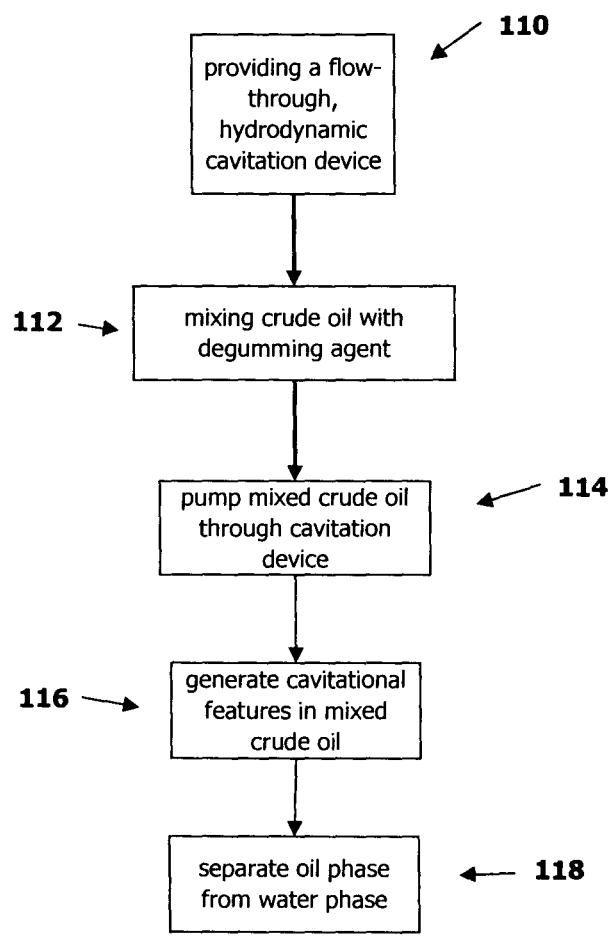
FIG. 1 is a flowchart illustrating a preferred embodiment of the inventive method.

FIG. 1 depicts a flowchart generally illustrating the inventive method. In this flow chart, the inventive method begins with providing (110) a flow-through, hydrodynamic cavitation device. Next, the crude oil is mixed (112) with a degumming agent as described herein. The mixed crude oil is then pumped (114) through the flow-through, hydrodynamic cavitation device. Passing the mixed crude oil through the cavitation device generates (116) cavitation features in the mixed crude oil. Finally, the mixed crude oil that has been passed through the cavitation device is separated (118) into an oil phase and a water phase. The use of a flow-through, hydrodynamic cavitation device results in a rapid degumming process that cannot be duplicated with prior art methods of cavitation. The flow-through design allows for high-volume throughput with greatly increased yields at a reduced cost. Prior art methods of cavitation are inefficient due to the means of generating cavitation. Prior art methods of cavitation are also time consuming and more costly because they do not have the high volume throughput capability of the inventive method or even require batch processing with a high residence time.

In a preferred embodiment, the raw or crude oil is combined with either water or a water solution to form a fluid medium comprised of an oil phase and a water phase. The water may comprise soft, distilled or reverse osmosis-purified water. The water solution preferably comprises suitable chemical degumming agents, i.e., phosphoric acid, citric acid, oxalic acid, tartaric acid, maleic anhydride, chelating agents or other similar reagents. Any of the prior art degumming methods discussed above can be employed in the inventive method. The fluid medium is then subjected to cavitation-assisted processing. The cavitation-assisted processing results in a rapid transfer of the contaminants from the oil phase to the water phase. After the cavitation-assisted processing, the fluid medium preferably undergoes a separation process whereby the oil phase is separated from the water phase.

The cavitation-assisted processing is accomplished through the use of a single or multi-stage, flow-through hydrodynamic cavitation device to create cavitation events in the fluid flow. Vapor compression and the formation of microjets accompany the implosion of the cavitation bubbles associated with the cavitation events or features. The collapse of the cavitation bubbles results in localized regions of increased pressure, increased temperature and vigorous mixing to degum and refine the oil. The increased pressure and temperature excite phospholipid molecules contained in fluid layers surrounding the bubbles, thereby driving them into the water phase. This action promotes gum formation, adsorption of metal-containing compounds and other reactions and processes. During the cavitation-assisted processing, calcium and other metals are believed to form carbonates to further lower the metal content of the oil.

During the cavitation-assisted processing, the gums are hydrated and agglomerate in the water phase. In order to isolate the refined oil and collect the valuable by-products, the cavitation-assisted processing may be followed by a downstream separation procedure. In the downstream separator, the gums are removed and sent to storage or for alternate processing. Such separation procedures include sedimentation, centrifugation, filtration, distillation, extraction, washing or other similar procedures. The isolated gums can be used as an animal feed additive or for producing lecithin.

Such separation can be accomplished in a centrifuge at ambient temperatures or after preliminary heating, for example to 50° C. The separated gums usually have an Acid Value of about 0.3 mg KOH/g. Thus, it is typically not necessary to neutralize the gums prior to bleaching and/or deodorizing separated gums. With 2-3% by volume of water added during the degumming process, the moisture content of degummed oil is usually about 0.1% by mass. Thus, no drying is required and the oil can be subjected to downstream refining or used for biodiesel production.

In another preferred embodiment, oil degumming is performed simultaneously with or is followed by additional cavitation processing to fully hydrate phosphatides and transfer them from the oil phase to the water phase. The bubbles generated during this subsequent cavitation processing are comprised of the vapors of the compounds that are volatile under the cavitation conditions. These volatile compounds typically include those to be removed during bleaching or deodorization. In a particularly preferred embodiment, a cavitation fluid such as hexane is used as a solvent for the oil to enhance flux. Energy released by the implosion of the bubbles disrupts the structure of the water molecules and activates other volatile molecules, forcing them to react and form different compounds that do not have to be removed by bleaching or deodorization.

The cavitation phenomenon is categorized by the cavitation number $C_v$, defined as: $C_v=(P-P_v)/0.5\rho V^2$, where P is the pressure downstream of the constriction, $P_v$ is the vapor pressure of fluid, V is fluid's velocity at the orifice, and $\rho$ is its density. Cavitation starts ideally at the cavitation inception number $C_{vi}=1$, and the $C_v<1$ implies a high degree of cavitation. The quantity of cavitation events in a unit of flow is another important parameter (Suslick, 1989; Didenko et al., 1999; Suslick et al., 1999; Young, 1999; Gogate, 2008; Zhang et al., 2008; Passandideh-Fard and Roohi, 2008).

The implosion of the bubbles results in the formation of deformed micro bubbles. When these deformed micro bubbles move into a reduced pressure zone, they become nuclei, enhancing the cavitation field density and lowering the cavitation threshold. Such enhancement facilitates gum formation and separation from the oil phase. This makes flow-through cavitation devices especially suitable for degumming and refining oils.

The size of the cavitational features, i.e., bubbles, depends on the properties of the fluid flow, the design of the cavitational device, the flow velocity sustained by the pump, the temperature of the fluid flow, and other treatment conditions. In practice, the pump pressure is increased until a proper cavitation field is achieved. In addition to impacting the size, concentration and vapor composition of the cavities, the inlet pressure affects the composition of the processed medium. The desirable outcome is obtained by generating hydrodynamic cavitation having an optimal cavitation number and density consistently throughout the fluid flow. The preferred embodiment of the present invention optimizes the cavitation to efficiently degum oil by applying the most suitable pump pressure, selected from a range of 50-5,000 psi. Further, the efficiency of cavitation-assisted degumming is high for a wide range of temperatures, allowing for better preservation of unstable valuable ingredients when degumming at low temperatures.

A practical approach to optimize process yield is to establish an inlet pressure that provides enough cavitational features for thorough mixing of the water and oil, hydration of the phosphatides, and agglomeration of gums in the water phase. The amount of water that is added to the crude oil is preferably within the range of 1-5% by volume. The actual amount can vary depending upon the phosphorus content and the level of other impurities in the crude oil. In an alternate embodiment, the oil is subjected to a first cavitation process in the absence of water followed by a second cavitation process in the presence of water or suitable chemical degumming agents.

Use of steam may improve cavitation-assisted processing in certain situations. However, one skilled in the art understands that different oils require different conditions in order for efficient degumming to occur. Therefore, the 50-5,000 psi range is not intended to limit the use of the present invention. Cavitation-assisted degumming can be repeated as many times as needed to achieve the desired results.

In a preferred embodiment, crude oil is combined with water and has a temperature in the range of 20-25° C. The volume of water that is added to the crude oil is preferably in the range of 1.8% to 2.4% by volume of crude oil. These numbers assume that the phosphorous concentration in the crude oil is about 1,000 ppm.

In another preferred embodiment, crude oil is combined with a solution of phosphoric acid and water. The temperature of both the crude oil and the acid solution lie within the range of 20-25° C. First, the phosphoric acid solution is added to the crude oil and the mixture is passed through a cavitation device to create a fine emulsion. Second, water, such as soft, distilled or reverse osmosis-purified water, is added to the fluid flow and the fluid flow is again passed through the cavitation device. As before, the volume of water that is added to the crude oil is preferably in the range of 1.8% to 2.4% by volume of crude oil. This ratio affords a higher degree of refining.

The following examples are given for illustrating the present invention and should not be construed as a limitation on either the scope or spirit of the invention.

Example 1

Ten liters of soybean oil that has been water-degummed with a conventional method, yet still, contained 137 ppm phosphorus according to analysis, was heated to 70° C. and mixed with 3% by volume of distilled water heated to 70° C. The mixture was subjected to a single pass through a flow-through cavitation device. After cavitation, the concentration of phosphorus dropped to 8.82 ppm, which corresponds to a removal of 93.6% of the phosphatides.

Example 2

Ten liters of crude soybean oil that has a phosphorus concentration as high as 1,230 ppm and 5 ppm iron was heated to 70° C. and mixed with 3% by volume of distilled water heated to 70° C. The mixture was subjected to a single pass through a multi-stage, flow-through cavitation device at an inlet pump pressure of 1,000 psi. The processing temperature of the cavitation device was ambient temperature. After cavitation, the mixture was centrifuged to separate the oil from the gums and the treatment was repeated. From the results in Table 1 it can be seen that 97.2% of the phosphorus was removed after the first treatment and 97.8% of the phosphorus was removed after the second treatment. Iron concentration was lowered by 80%.

TABLE 1

| Impurity | Analytical method | Detection limit, ppm | Concentration, ppm | | |
|---|---|---|---|---|---|
| | | | Before | After first treatment | After second treatment |
| Phosphorus | ASTM 4951/ICP | 1.00 | 1,230 | 34.3 | 27.3 |
| Iron | ASTM 4951/ICP | 0.5 | 5 | 1 | 1 |

Example 3

As shown in Table 2, a single pass of crude soybean oil in the presence of 1% by volume of de-ionized water through a multi-stage, flow-through cavitation device resulted in the removal of 96.1% of the phosphorus. The initial temperature of the oil-water mixture was 14° C. Due to the cavitation process, the temperature was raised to 21° C. after a single passage through the multi-stage, flow-through cavitation device at a pump pressure of 1,000 psi. The cavitation-assisted degumming resulted in the formation of light-colored, non-damaged gums suitable for the production of lecithin.

TABLE 2

| Impurity | Method | Detection limit, ppm | Concentration, ppm | |
|---|---|---|---|---|
| | | | Before | After 1 passage |
| P | EN 14538 ICP-OES | 1.00 | 1,312 | 51.5 |
| Ca | EN 14538 ICP-OES | 1.00 | 129 | 20.6 |
| Fe (dissolved) | EPA 6010 | 0.5 | 2 | Not detected |
| Mg | EN 14538 ICP-OES | 1.00 | 148 | 12.8 |

Example 4

Crude soybean oil having 1,225 ppm P, 106 ppm Ca, 123 ppm Mg, and 4 ppm dissolved Fe was mixed with 3% by volume of water and 0.05% by volume concentrated phosphoric acid. The mixture was heated to 35° C. and passed through a multi-stage, flow-through cavitation device. The processed mixture was then heated to 55° C. and the gums were separated from the oil phase by centrifuging. The separated gums were analyzed and were found to have 8,197 ppm P, 1,007 ppm Ca, 981 ppm Mg, and 15 ppm dissolved Fe. The oil had residual concentrations of 14.0 ppm P, 5.21 ppm Ca, 3.17 ppm Mg, and iron that was below the limit of detection (0.5 ppm). The data confirms that the metals and phosphatides accumulated in the water phase. This is believed to have occurred because of complex formation, extraction, adsorption and other reactions and processes facilitated by the cavitation.

Example 5

Pre-heated soybean oil was combined with 0.05% by volume of an 85% phosphoric acid solution having a density of 1.7 g/ml. The oil and acid solution was then combined with 2% by volume of distilled water. The mixture was agitated for 5 min and then subjected to a single pass through two multi-stage, flow-through cavitation devices connected in series. Table 3 shows that 99.1% of the phosphorus in the oil was removed along with significant amounts of metals and sulfur. A decrease in FFA content was also observed. Average FFA concentration of the cavitation-degummed oil was 0.4-0.8%.

TABLE 3

| Impurity | Analytical method | Detection limit | Concentration | |
|---|---|---|---|---|
| | | | Before | After 1 pass |
| P | ASTM 4951/ICP | 1.00 ppm | 733 ppm | 6.37 ppm |
| Ca | EN 14538 ICP-OES | 1.00 ppm | 90.4 ppm | 1.78 ppm |
| Cu (dissolved) | EPA 6010 | 0.1 ppm | Not detected | Not detected |
| Fe (dissolved) | EPA 6010 | 0.5 ppm | 2 ppm | Not detected |
| Mg | EN 14538 ICP-OES | 1.00 ppm | 98.9 ppm | Not detected |
| S | ASTM 5453 | 0.5 ppm | 13.4 ppm | 1.3 ppm |
| FFA | USP | 0.1% | 0.8% | 0.7% |

Example 6

Crude soybean oil originally having 488 ppm P was mixed with 0.05% by volume of concentrated phosphoric acid and 1.5% by volume of water. The mixture was subjected to a cavitation process at ambient temperature. The refined product contained as little as 5.29 ppm P, less than 0.5 ppm dissolved Fe, and less than 1 ppm of both Ca and Mg.

Example 7

Crude soybean oil was mixed with 3% by volume of water and subjected to a single pass through a multi-stage, flow-through cavitation device at an initial pump pressure of 1,000-psi. The temperature of the mixture was 19.6° C. before and 28° C. after the cavitation-assisted degumming. The data in Table 4 shows that 99.1% of the phosphorus was removed along with significant amounts of metals and other compounds.

TABLE 4

| Impurity | Method | Detection limit, ppm | Concentration, ppm | |
|---|---|---|---|---|
| | | | Before | After 1 passage |
| P | EN 14538 ICP-OES | 1.00 | 1,312 | 12.1 |
| Ca | EN 14538 ICP-OES | 1.00 | 129 | 6.98 |
| Fe (dissolved) | EPA 6010 | 0.5 | 2 | Not detected |
| Mg | EN 14538 ICP-OES | 1.00 | 148 | 3.92 |

Example 8

Crude soybean oil was mixed with 1.5% by volume water and subjected to a single pass through a multi-stage, flow-through cavitation device at an initial pump pressure of 1,250-psi. The temperature of the mixture was 11° C. before and 20° C. after the cavitation-assisted degumming. The data in Table 5 shows that 98.4% of the phosphorus was removed along with significant amounts of metals and compounds.

TABLE 5

| Impurity | Method | Detection limit, ppm | Concentration, ppm | |
|---|---|---|---|---|
| | | | Before | After 1 passage |
| P | EN 14538 ICP-OES | 1.00 | 1,312 | 20.8 |
| Ca | EN 14538 ICP-OES | 1.00 | 129 | 9.53 |
| Fe (dissolved) | EPA 6010 | 0.5 | 2 | Not detected |
| Mg | EN 14538 ICP-OES | 1.00 | 148 | 5.48 |

Example 9

The same crude soybean oil from Example 8 was mixed with 0.05% by volume concentrated phosphoric acid at 35° C. and then passed through a multi-stage, flow-through cavitation device. The processed mixture was combined with 3% by volume water and subjected to a second pass through the same multi-stage, flow-through cavitation device. After the second pass, the phosphorus concentration decreased by 99.4% to 7.87 ppm. The concentrations of Ca and Mg decreased to 3.11 ppm and 1.82 ppm, respectively.

Example 10

The same crude soybean oil from Example 8 was mixed with 2% by volume soft water at 19.4° C. and then subjected to one pass through a multi-stage, flow-through cavitation device. The processed mixture was heated to 50° C. and separated by sedimentation and centrifugal processes in order to separate the gums from the oil. Phosphorus concentration in the oil dropped to 10.5 ppm or by 99.2%. The concentrations of Ca and Mg decreased to 6.65 and 3.28 ppm, respectively. Sulfur concentration depends on 0.6 ppm and that of waxes and other metals was lowered significantly, too.

Example 11

Corn processing in a bioethanol plant results in a by-product containing oil, waxes and approximately 18% FFA. Such composition cannot be used directly for biodiesel production. According to the present invention, the by-product was combined with 3% by volume water and passed through a multi-stage, flow-through cavitation device. After cavitation, the wax precipitated out and was removed. The processed by-product can be mixed in a 1:19 ratio with soybean oil or tallow containing 1.2% FFA and used for the production of superior quality biodiesel fuels by a separate process. Since existing methods of de-waxing such by-products of bioethanol production is expensive, the cavitation-assisted refining is an affordable alternative, facilitating utilization of these by-products.

As described above, hydrodynamic cavitation is the formation of vapor-filled cavities in the fluid flow, which is followed by bubble collapse in a high-pressure zone. In practice, the process is performed as follows: the fluidic flow is pumped into an inlet on the cavitation device. In localized zones, the flow velocity increases causing the fluid pressure to drop according to Bernoulli's law. This leads to the formation of bubbles filled with the vapors of compounds that boil under the given conditions. When the bubbles move past the low pressure zone, the pressure in the flow increases such that the bubbles collapse. This exposes the vapors within the bubbles and the surrounding medium to increased pressure and temperature, strong shearing forces, shock waves, acoustic vibration and electromagnetic irradiation. Such alteration of the medium results in reactions taking place within the collapsing bubbles or/and in the adjacent fluid layers. Preferred embodiments of the cavitation devices capable of achieving the objects of the present invention are disclosed in co-pending U.S. patent application Ser. Nos. 12/144,539, 12/395,110 and 12/464,646. The entirety of these applications is incorporated herein by this reference.

Figure 2:
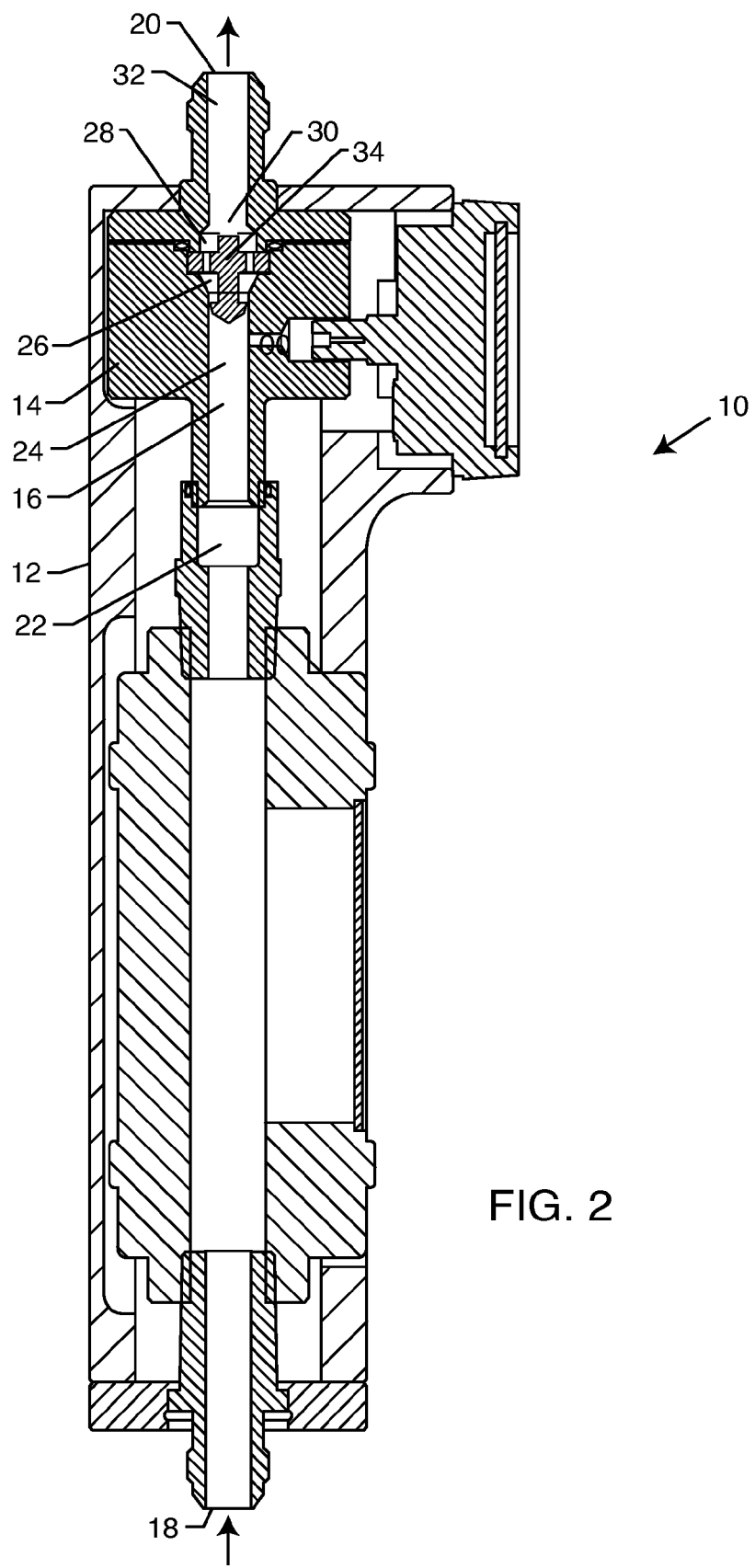
FIG. 2 illustrates a flow-through cavitation generator compatible with the present invention.

As illustrated in FIG. 2, one preferred embodiment of the cavitation device 10 used in the present invention includes a nano-cavitation generator 12 as described in U.S. application Ser. No. 12/144,539. The key component of the nano-cavitation generator 12 is the reaction chamber 14 having a flow path 16 between an inlet 18 and outlet 20. The flow path 16 defines a series of compartments having varying diameters and surface features, including an inlet compartment 22, a constriction compartment 24, a first reaction compartment 26, a second reaction compartment 28, a final reaction compartment 30 and outlet compartment 32. A plasmator 34 is positioned in the flow path 16 across the constriction compartment 24 and the first reaction compartment 26. The configuration and operation of the generator 12, including the plasmator 34, is as described in U.S. application Ser. No. 12/144,539.

Figure 3:
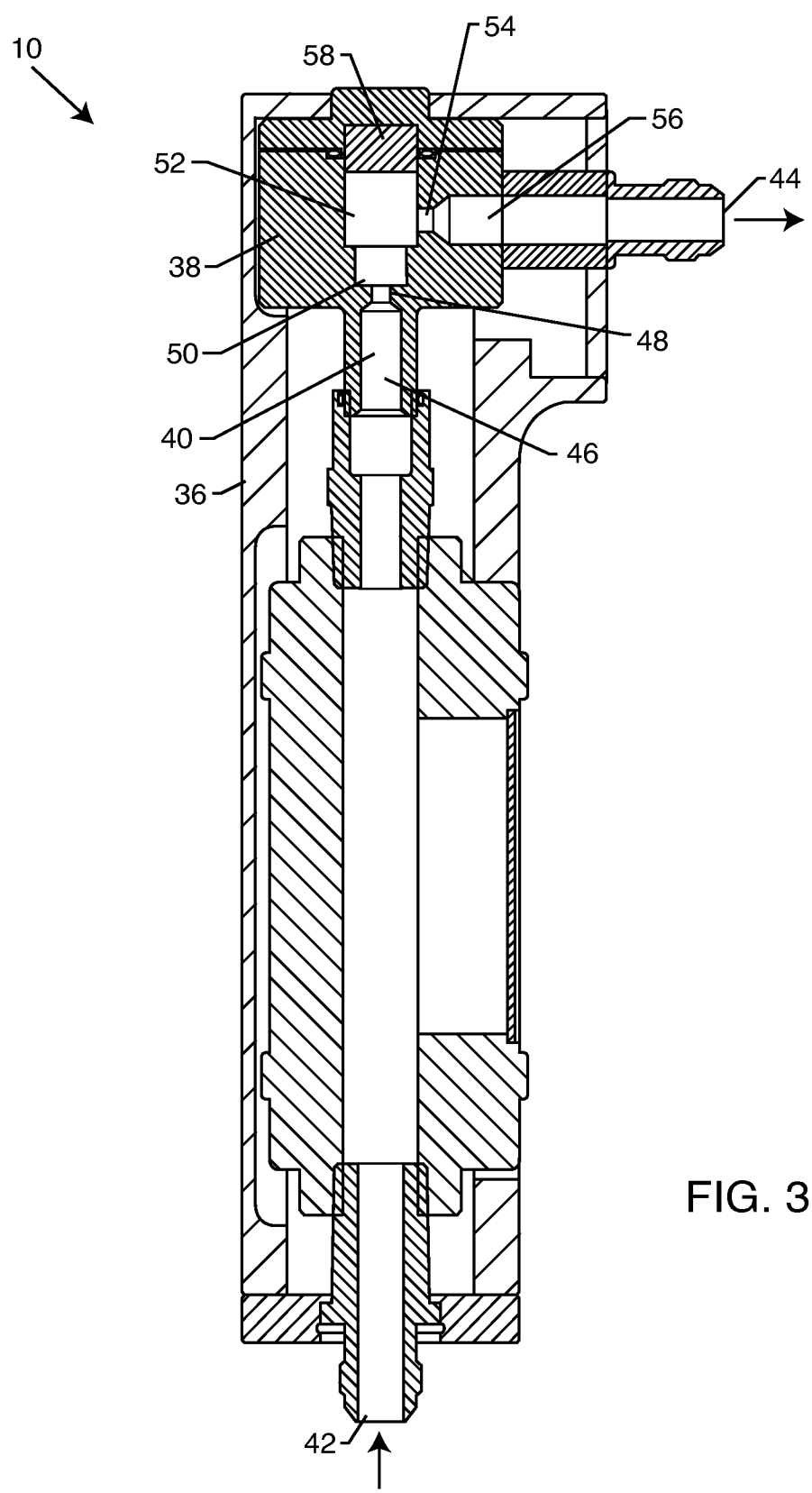
FIG. 3 illustrates another flow-through cavitation generator compatible with the present invention.

As illustrated in FIG. 3, another preferred embodiment of the cavitation device 10 includes a nano-cavitation generator 36 as described in U.S. application Ser. No. 12/144,539. In this generator 36, the reaction chamber 38 has a flow path 40 between and inlet 42 and an outlet 44. The flow path 40 defines a series of compartments having varying diameters and surface features, including a constriction compartment 46, an inlet orifice 48, a first transition compartment 50, an impact compartment 52, an outlet orifice 54, and an outlet compartment 56. An impact pad 58 is positioned in the impact compartment 52 opposite the opening from the first transition compartment 50. The configuration and operation of the generator 36, including the impact pad 58, is as described in U.S. application Ser. No. 12/144,539.

Figure 4:
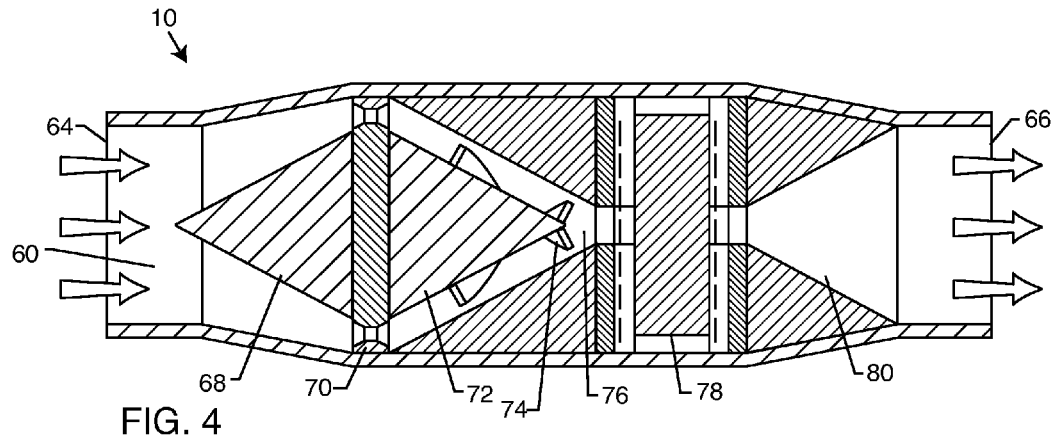
FIG. 4 illustrates a multi-stage flow-through cavitation generator compatible with the present invention.

As illustrated in FIG. 4, another preferred embodiment of the cavitation device 10 includes a multi-stage generator 60 as described in U.S. application Ser. No. 12/395,110. The cavitation generator 60 has a flow path 62 between an inlet 64 and an outlet 66. The flow path 62 has various structures including an inlet cone 68, a multi-jet nozzle 70, a guide cone 72 featuring spiral guides 74, a working chamber 76, a vortex generator 78, and an atomizing cone 80. The configuration and operation of the generator 60, including the multi-jet nozzle 70 and vortex generator 78, is as described in U.S. application Ser. No. 12/395,110.

Figure 5:
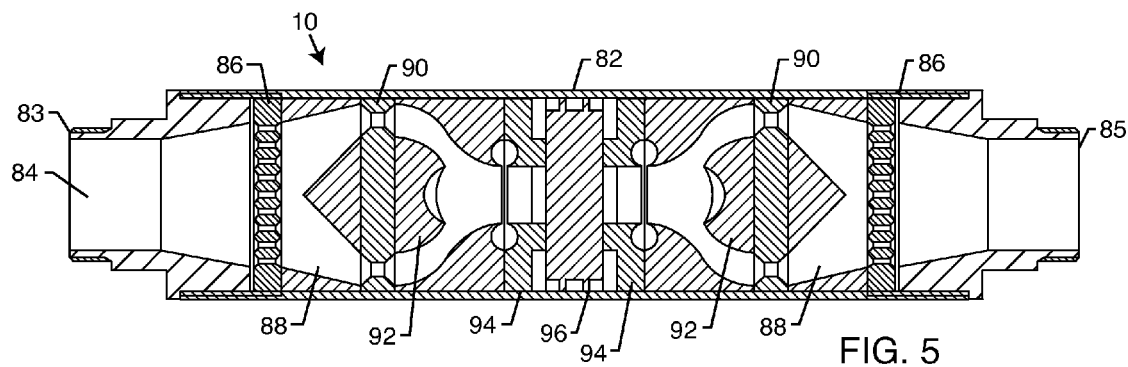
FIG. 5 illustrates another multi-stage flow-through cavitation generator compatible with the present invention.

As illustrated in FIG. 5, another preferred embodiment of the cavitation device 10 includes a multi-stage cavitation generator 82 as described in U.S. application Ser. No. 12/464,646. The cavitation generator 82 has a flow path 84 having an inlet 83 and an outlet 85. The flow path 84 has various structures including multi-jet nozzles 86, working chambers 88, flow guides 90, hemi-spherical bodies 92, turbulizer disks 94, and a vortex chamber 96. The structures in the flow path 84 are arranged with mirrored symmetry around a mid-point of the device which is positioned in the vortex chamber 96. The configuration and operation of the generator 82, including the multi-jet nozzles 86, flow guides 90, hemi-spherical bodies 92, turbulizer disks 94 and vortex generator 96, is as described in U.S. application Ser. No. 12/464,646.

Figure 6:
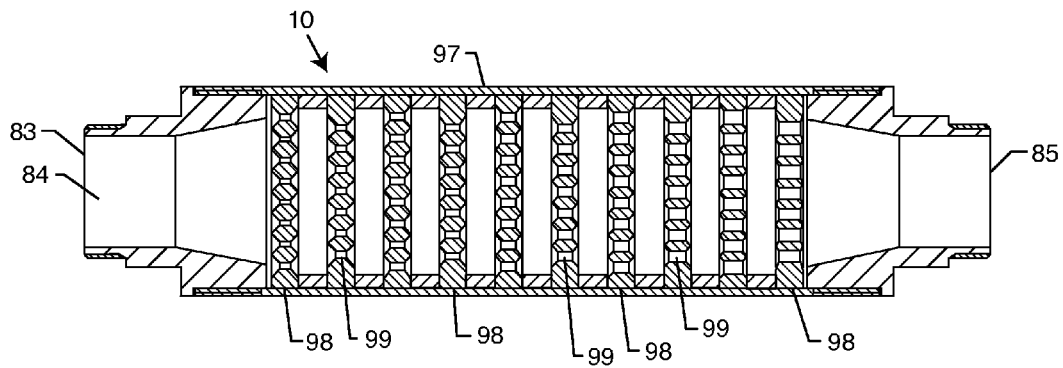
FIG. 6 illustrates another multi-stage flow-through cavitation generator compatible with the present invention.

As illustrated in FIG. 6, yet another preferred embodiment of the cavitation device 10 includes a multi-stage cavitation generator 97 as described in U.S. application Ser. No. 12/464,646. The cavitation generator 97 has a flow path 84 having an inlet 83 and an outlet 85. The flow path 84 has a series of multi-jet nozzles 98 disposed therein. Each of the multi-jet nozzles 98 include a series of channels 99 disposed across their surfaces, with the size and construction of the channels 99 varying from nozzle to nozzle. The configuration and operation of the generator 97, including the multi-jet nozzles 98 and channels 99, is as described in U.S. application Ser. No. 12/464,646.

The flow-through cavitation apparatus should be fabricated of inert materials. To enhance the resistance to phosphoric acid and other corrosive agents, the inner parts can be coated with ceramics, plastics, Teflon, nanodiamonds and other suitable materials and their composites. The device's properties can be optimized via hardening, anodizing, bonding, and other technologies. In another embodiment, lipase and/or other enzymes can be disposed on the device's inner surface or are supported by magnetic or other particles that can be attached at a desired location. The cavitation device can be equipped with a selective membrane to provide even better removal of phosphatides and other impurities via ultrafiltration.

The cavitation apparatus can be placed at an oil pressing site, nearby a storage container or attached to such a structure. Yet another possibility exists, in which the device is not fixed but movable. The cavitation device is designed to degum large volumes of oil. Additional lines and skid systems can be assembled to scale up the degumming capacity. Placement of one device may be combined with the placement of another one. These systems can be easily mounted and transported, making them suitable for field and remote locations. In practice, it is necessary to take into account the device cost, its production capacity and the subsequent energy, maintenance and operation cost. An operator of the cavitation degumming device is not required to wear hearing protection as would be necessary in the case of high-frequency sound cavitation.

A preferred example of an efficient cavitation apparatus, which is especially suitable for degumming, is an assembly comprised of two 7-stage cavitation reactors installed in-line sequentially at a pump pressure of 800-1250 psi. Preferably, the pump pressure of the first reactor is about 1,250 psi and that of the second reactor is approximately 625 psi, and the system's flow rate is about 20 gallons per minute.

According to the co-pending applications, the cavitation device allows for the control of the intensity of the cavitation field by modifying the inlet pressure, the inlet temperature and the composition of the fluid medium. For example, the viscosity of certain oils, fluidic fats or tallows can be lowered by adding solvents or surfactants or mixtures thereof. In addition, the viscosity can be lowered by heating, applying external electric or magnetic fields or a combination thereof.

The present invention creates beneficial conditions that cannot be duplicated by the prior art. The process efficiency is high and can be enhanced by consecutive applications of high pressure, elevated heat, turbulence and vigorous mixing applied in a flow-through manner within a short period. The preferred embodiments of the present invention apply optimized levels of both pressure and heat by the controlled flow-through hydrodynamic cavitation. The process is independent of external conditions and provides a highly effective means of degumming, refining, removal of both hydratable phosphatides and NHP, metals and other impurities, and changing oil composition and properties uniformly throughout the flow.

Important economic benefits are experienced through the use of the present invention. The optimized usage of a flow-through hydrodynamic cavitation serves to lower equipment, handling and energy costs, as it improves the efficiency of refining and especially degumming. Cavitation-assisted degumming presents fewer environmental problems and is economically feasible. The combination of technological simplicity and economic feasibility makes the cavitation-assisted degumming attractive for both small and large oil production.

The beneficial effects gained through the present invention cannot be achieved through sonic or ultrasonic cavitation, rotor-stator cavitation or other prior art cavitation methods because the conditions created by the flow-through cavitation device cannot be duplicated by other means. In sound-induced cavitation, the bubbles form a barrier to further transmission and attenuate the sound waves, limiting the effective range of the induced sound waves. Furthermore, the ultrasonic irradiation modifies media at the specific locations, depending on the frequency and source power. The present invention overcomes these limitations, purifying oil in a uniform manner. This invention efficiently degums oil by supplying energy sufficient to drive these processes and reactions. Thus, the present invention provides a better means of refining and producing gums of superior quality.

The preferred embodiments of the present invention are disclosed herein. However, it should be understood that the disclosed embodiments are merely exemplary of the invention, which may be embodied in various forms. Therefore, the details disclosed herein are not to be interpreted as limiting, but merely as informative of the invention and as a basis for teaching one skilled in the art how to make and how to use the present invention.

Although several embodiments have been described in detail for purposes of illustration, various modifications may be made without departing from the scope and spirit of the invention. Accordingly, the invention is not to be limited, except as by the appended claims.

What is claimed is:

1. A method for degumming and/or refining crude oil containing impurities, comprising the steps of:
   providing a flow-through, hydrodynamic cavitation device having a flow path there through;
   mixing the crude oil with a degumming agent to form mixed fluid having an oil phase and a water phase, the degumming agent consisting essentially of water in an amount not to exceed 3% by volume of the crude oil containing impurities;
   pumping the mixed fluid into the flow path of the cavitation device at a pre-determined pump pressure;
   generating cavitational features in the mixed fluid such that the impurities are transferred from the oil phase to the water phase; and
   separating the oil phase from the water phase.

2. The method of claim 1, further comprising the step of agitating the mixed fluid prior to performing the pumping and generating steps.

3. The method of claim 1, further comprising the step of processing the crude oil in the cavitation device prior to performing the mixing step.

4. The method of claim 1, further comprising the step of repeating the pumping and generating steps prior to performing the separating step.

5. The method of claim 1, further comprising the step of repeating the mixing, pumping, generating and separating steps using the separated oil phase.

6. The method of claim 1, wherein the separating step is performed using sedimentation, centrifugation, filtration, distillation, extraction or washing.

7. The method of claim 1, wherein the impurities comprise phosphatides, free fatty acids, off-flavor compounds, sulphurous compounds, pigments, chlorophyll, waxes, metals, carbohydrates, liposaccharides, proteins, aldehydes, ketones, terpenes, sterols or carotenes.

8. The method of claim 1, wherein the crude oil comprises edible vegetable oil, animal fat or tallow, or oil from bacteria, yeast, algae, prokaryotes or eukaryotes.

9. A method for degumming and/or refining crude oil containing impurities, comprising the steps of:
   providing a flow-through, hydrodynamic cavitation device having a flow path there through, the flow path comprising a multi-jet nozzle having a plurality of channels, a plurality of spiral guides in a working chamber, a plurality of flow guides in a vortex chamber, and an atomizing cone having an increasing cross-sectional area;
   mixing the crude oil with a degumming agent to form mixed fluid having an oil phase and a water phase;
   pumping the mixed fluid into the flow path of the cavitation device at a pre-determined pump pressure such that the mixed fluid interacts with the multi-jet nozzle, the plurality of spiral guides, the plurality of flow guides, and the atomizing cone;
   generating cavitational features in the mixed fluid within the flow path as the mixed fluid passes through the multi-jet nozzle, the plurality of spiral guides, and the plurality of flow guides such that the impurities are transferred from the oil phase to the water phase;
   collapsing the cavitational features in the mixed fluid within the flow path as the mixed fluid interacts with the atomizing cone; and
   separating the oil phase from the water phase.

10. The method of claim 9, further comprising the step of agitating the mixed fluid prior to performing the pumping and generating steps.

11. The method of claim 9, further comprising the step of processing the crude oil in the cavitation device prior to performing the mixing step.

12. The method of claim 9, further comprising the step of repeating the mixing, pumping, generating and separating steps using the separated oil phase.

13. The method of claim 9, wherein the separating step is performed using sedimentation, centrifugation, filtration, distillation, extraction or washing.

14. The method of claim 9, wherein the degumming agent comprises water, steam, phosphoric acid, citric acid, oxalic acid, tartaric acid, malic acid, fumaric acid, aspartic amino acid, ethylenediaminetetraacetic acid, alkali, salts, chelating agents, crown ethers, soluble or immobilized lipases, enzymes, or maleic anhydride.

15. The method of claim 9, wherein the impurities comprise phosphatides, free fatty acids, off-flavor compounds, sulphurous compounds, pigments, chlorophyll, waxes, metals, carbohydrates, liposaccharides, proteins, aldehydes, ketones, terpenes, sterols or carotenes.

16. The method of claim 9, wherein the crude oil comprises edible vegetable oil, animal fat or tallow, or oil from bacteria, yeast, algae, prokaryotes or eukaryotes.

17. A method for degumming and/or refining crude oil containing impurities, comprising the steps of:
   providing a flow-through, hydrodynamic cavitation device having a flow path there through, the flow path comprising at least seven cavitation zones;
   mixing the crude oil with a degumming agent to form mixed fluid having an oil phase and a water phase;
   pumping the mixed fluid into the flow path of the cavitation device at a pre-determined pump pressure such that the mixed fluid interacts with each of the at least seven cavitation zones;
   generating cavitational features in the mixed fluid within each of the at least seven cavitation zones within the flow path;
   collapsing the cavitational features in the mixed fluid between every two adjacent of the at least seven cavitation zones;
   transferring the impurities from the oil phase to the water phase in the mixed fluid during each of the generating and collapsing steps; and
   separating the oil phase from the water phase.

18. The method of claim 17, further comprising the step of agitating the mixed fluid prior to performing the pumping and generating steps.

19. The method of claim 17, further comprising the step of processing the crude oil in the cavitation device prior to performing the mixing step.

20. The method of claim 17, further comprising the step of repeating the mixing, pumping, generating and separating steps using the separated oil phase.

21. The method of claim 17, wherein the degumming agent comprises water, steam, phosphoric acid, citric acid, oxalic acid, tartaric acid, malic acid, fumaric acid, aspartic amino acid, ethylenediaminetetraacetic acid, alkali, salts, chelating agents, crown ethers, soluble or immobilized lipases, enzymes, or maleic anhydride.

22. The method of claim 17, wherein the crude oil comprises edible vegetable oils, animal fat or tallow, or oils from bacteria, yeast, algae, prokaryotes or eukaryotes and the impurities comprise phosphatides, free fatty acids, off-flavor compounds, sulphurous compounds, pigments, chlorophyll, waxes, metals, carbohydrates, liposaccharides, proteins, aldehydes, ketones, terpenes, sterols or carotenes.

23. The method of claim 17, wherein the separating step is performed using sedimentation, centrifugation, filtration, distillation, extraction or washing.

24. A method for degumming and/or refining oil containing impurities, comprising the steps of:
  providing a flow-through, hydrodynamic cavitation device having a flow path there through, the flow path comprising at least two disk multi-jet nozzles and a central vortex chamber between the at least two disk multi-jet nozzles, wherein each disk multi-jet nozzle has a plurality of through channels across their surfaces and the vortex chamber has a cylindrical body with perimeter flow guides;
  pumping oil containing impurities into the flow path of the flow-through, hydrodynamic cavitation device at a pre-determined pump pressure, such that the oil containing impurities interacts with each disk multi-jet nozzle and the vortex chamber;
  mixing a degumming agent with the oil containing impurities;
  generating cavitational features in the oil containing impurities within the flow-through, hydrodynamic cavitation device flow path as the oil containing impurities passes through the at least two disk multi-jet nozzles and the central vortex chamber, such that the impurities are transferred from an oil phase to a water phase; and
  separating the oil phase from the water phase.

* * * * *